(12) United States Patent
Collins (10) Patent No.: US 11,833,914 B2
(45) Date of Patent: Dec. 5, 2023

(54) ELECTRIC VEHICLE BATTERY PACK HAVING SEALED COVER

(71) Applicant: Rivian IP Holdings, LLC, Plymouth, MI (US)

(72) Inventor: Tyler Collins, Irvine, CA (US)

(73) Assignee: Rivian IP Holdings, LLC, Plymouth, MI (US)

(*) Notice: Subject to any disclaimer, the term of this patent is extended or adjusted under 35 U.S.C. 154(b) by 120 days.

(21) Appl. No.: 17/183,679

(22) Filed: Feb. 24, 2021

(65) Prior Publication Data

US 2022/0266701 A1 Aug. 25, 2022

(51) Int. Cl.
| | |
|---|---|
| *B60L 50/64* | (2019.01) |
| *B60K 1/04* | (2019.01) |
| *H01M 50/271* | (2021.01) |
| *H01M 50/204* | (2021.01) |

(52) U.S. Cl.
CPC .......... *B60L 50/64* (2019.02); *B60K 1/04* (2013.01); *H01M 50/204* (2021.01); *H01M 50/271* (2021.01)

(58) Field of Classification Search
CPC ........ B60K 1/04; B60L 50/64; H01M 50/204; H01M 50/271; H01M 50/209; H01M 50/249; H01M 50/262
See application file for complete search history.

(56) References Cited

U.S. PATENT DOCUMENTS

| | | | |
|---|---|---|---|
| 7,066,632 B2 | 6/2006 | Burton | |
| 8,568,918 B2* | 10/2013 | Schroeter | ............ H01M 10/647 |
| | | | 429/178 |
| 9,653,748 B2 | 5/2017 | Kruger et al. | |
| 9,806,307 B2* | 10/2017 | Zheng | ................. H01M 50/516 |
| 10,522,798 B2* | 12/2019 | Oshiba | ................ H01M 50/209 |
| 11,211,656 B2* | 12/2021 | Matecki | ............... H01M 50/271 |
| 2015/0207119 A1* | 7/2015 | Onodera | ........... H01M 50/3425 |
| | | | 429/89 |
| 2015/0287155 A1* | 10/2015 | Stepanian | .............. G06Q 90/00 |
| | | | 705/500 |
| 2018/0233720 A1* | 8/2018 | Gang | .................. H01M 50/262 |
| 2020/0052252 A1* | 2/2020 | Smith | ................. H01M 50/271 |
| 2022/0336900 A1* | 10/2022 | Merino | ............... H01M 50/267 |

OTHER PUBLICATIONS

350z Z1 Upgraded Hatch Struts Ultra High Pressure, URL: https://www.torqen.uk/nissan/350z/body-styling/bonnet-dampers/18203-350z-z1-upgraded-hatch-struts-ultra-high-pressure-uhp.html (retrieved on Jan. 31, 2022).
Jeep WJ Grand Cherokee Auto Headlamps & Headlamp / Fog Lamp Alignment, URL: https://jeepspecs.com/wj-generation/electronics-lighting/auto-headlamps-headlamp-fog-lamp-alignment/ (retrieved on Jan. 31, 2022).

* cited by examiner

*Primary Examiner* — Jason D Shanske
*Assistant Examiner* — James J Triggs
(74) *Attorney, Agent, or Firm* — Haley Guiliano LLP (57) ABSTRACT

Electric vehicle battery pack whose cover is more fully sealed against leakage. The cover is connected to the battery pack frame by fasteners that are affixed to the surface of the cover rather than being fastened through holes therein, or that are sealed to prevent leakage. The cover thus has no, fewer, or sealed holes formed within, and thus has fewer pathways for leakage or infiltration of moisture into the battery pack.

19 Claims, 7 Drawing Sheets

ELECTRIC VEHICLE BATTERY PACK HAVING SEALED COVER

INTRODUCTION

The present disclosure is directed to electric vehicle battery packs. More specifically, the present disclosure is directed to electric vehicle battery packs having sealed covers.

SUMMARY

One component of electric vehicles is the battery pack. Conventional battery packs perform a number of functions, including providing a protective enclosure to withstand crashes, ground strikes or other impacts, submersion and moisture infiltration, and containment of battery fires. However, such battery packs are often insufficiently sealed, and thus risk leaking when the vehicle drives through rain, partially submerges, or the like. This presents the risk of moisture contacting the vehicle batteries, in turn presenting a significant risk of damage to the vehicle batteries.

Accordingly, systems and methods are disclosed herein that provide electric vehicle battery packs with sealed covers, thus reducing the risk of leakage and infiltration of water into the battery pack.

In some embodiments, an electric vehicle battery pack cover is provided which is affixed to the battery pack frame with coupling elements that do not extend through the cover, thus eliminating the need for any holes formed in the cover itself. The cover thus has a continuous, unbroken surface or structure, which is more resistant to leakage as compared to covers whose fasteners extend through the cover and thus create pathways for infiltration of water or other liquids.

In some embodiments, a battery pack includes a frame for surrounding and maintaining the structural integrity of electric vehicle batteries that are positioned within, as well as a cover that covers the frame and creates a sealed space for maintaining the batteries in a secure and dry environment. Accordingly, the cover has an unbroken and continuous surface. A number of fasteners are positioned on and affixed to the surface of the cover, rather than being attached to the cover with bolts or other mechanisms that require holes to be formed in the cover. The fasteners thus allow the cover to be removably affixed to the frame, while reducing the likelihood of leakage due to the unbroken cover surface.

Corresponding fasteners or fastener elements may be affixed to or otherwise formed in or on the frame, to detachably couple to respective ones of the cover fasteners. The fasteners of the cover and frame may be any type fasteners that allow for the cover to be removably affixed to the frame. Such fasteners may be, for example, any type of snap-fit fasteners, such as ball and socket fasteners.

The frame may be any type, shape, or configuration of frame suitable for securely maintaining batteries within. As one example, the frame may have side members and any number of cross members extending from one side member to another. The fasteners of the frame may be affixed to or otherwise formed in or on these cross members, in any number and/or arrangement. At least two fasteners may be affixed to or otherwise formed in or on a cross member. Cross members may have any other number of fasteners, e.g., four or more. Such fasteners may be located at any positions along the cross member, and may for example be placed at or near antinodes of any vibrational modes of the cover, to reduce cover vibration during vehicle operation.

A seal may be placed between the frame and top cover to contact the two and provide a waterproof seal therebetween. The seal may, for example, extend along an outer edge of the surface of the top cover to surround the fasteners.

While some embodiments of the disclosure employ a continuous and unbroken cover with no holes therethrough to accommodate fasteners (that is, the fasteners do not extend through any surface of the cover), other embodiments may alternatively employ fasteners that extend through the cover to removably couple the top cover to the frame. Such fasteners may be sealed to prevent or reduce the risk of leakage. Such fasteners may be permanently installed such that the fasteners do not need to be removed from the cover to remove the cover.

In some embodiments, the fasteners are adhesively affixed to the surface of the top cover.

Embodiments of the disclosure may thus provide an electric vehicle battery pack cover with a surface for coupling to a frame of the battery pack, where the surface has a seal or area for accommodating such a seal, as well as a number of fasteners affixed within the seal area. In this manner, a more waterproof cover is provided, reducing the risk of leakage or infiltration of moisture.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

In one embodiment, the disclosure relates to an electric vehicle battery pack whose cover is more fully sealed against leakage. The cover is connected to the battery pack frame by fasteners that are affixed to the surface of the cover rather than being fastened through holes therein, or that are sealed to prevent leakage. The cover thus has no, fewer, or sealed holes formed within, and thus has fewer pathways for leakage or infiltration of moisture into the battery pack.

Fastening elements may be affixed to both the cover and corresponding locations on the battery pack frame. Any type of releasable fastener may be employed, e.g., snap-fit fasteners such as ball and socket fasteners. Fasteners may be placed at any locations on the cover and frame, such as along frame elements including cross members. Fasteners may also be positioned to reduce vibration of the cover, such as at or near antinodes of various cover vibration modes. In this manner, fasteners may not only secure the cover to the frame in a more leakproof manner, but may also aid in reducing vibration and noise generated by the cover during vehicle operation. In some embodiments, bolts are used through bolt holes 130 to secure and seal the outer portion of the cover to the frame and the fastening element are used to reduce vibrations of the inner portion of the cover during vehicle operation. Vibrations of the cover can cause audible sounds within the occupant cabin of the electric vehicle, which is undesirable.

Figure 1A:
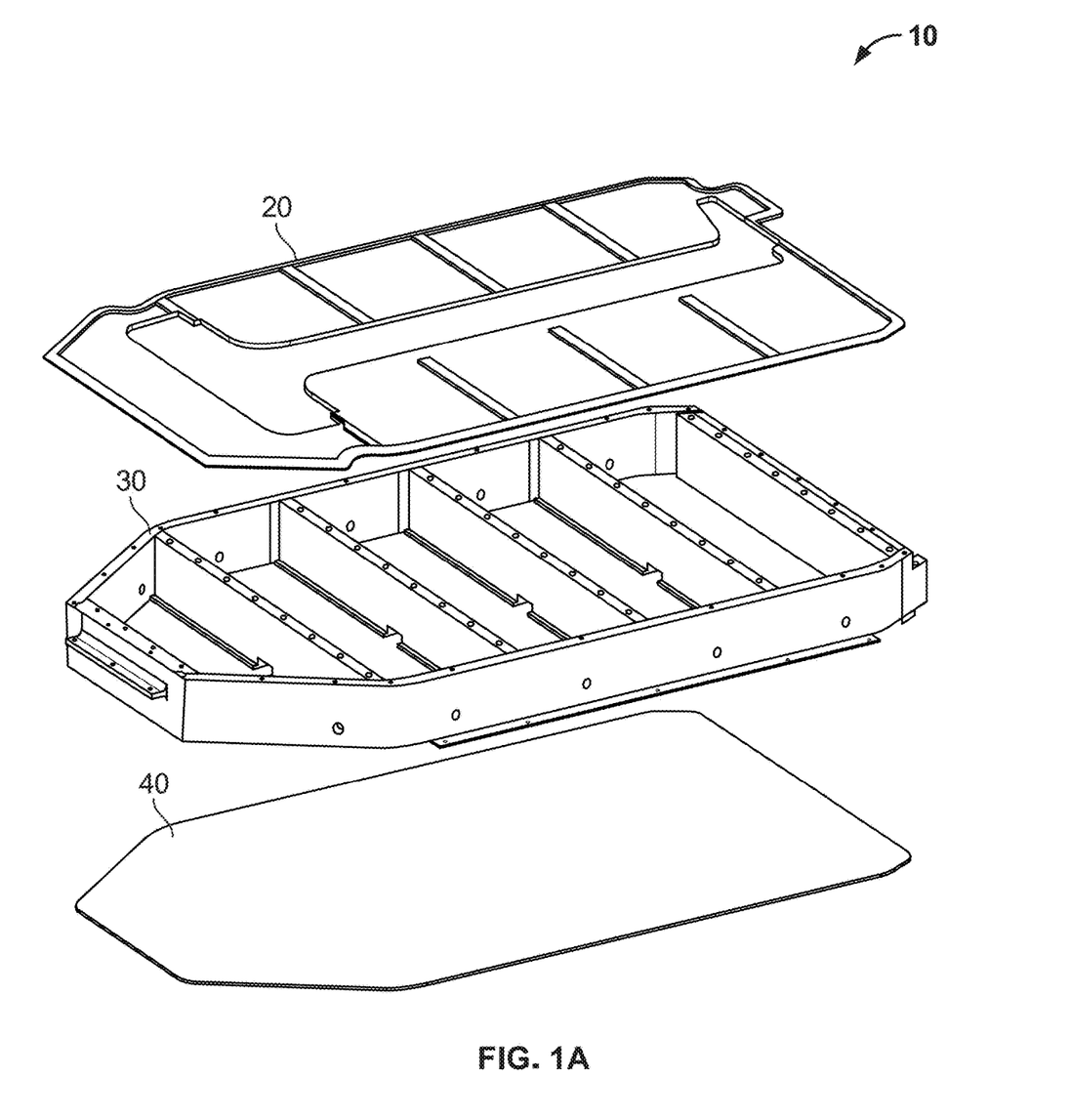
FIG. 1A is an isometric exploded view of an exemplary battery pack constructed in accordance with some embodiments of the disclosure.

FIG. 1A is an isometric exploded view of an exemplary battery pack constructed in accordance with some embodiments of the disclosure. Here, an electric vehicle battery pack 10 includes a cover 20, frame 30, and strike shield 40. The cover 20 and strike shield 40 are affixed to opposing sides, e.g., top and bottom surfaces, of the frame 30 to collectively define spaces within the frame 30 for receiving and protecting a number of batteries and other electrical elements that provide power for an electric vehicle.

Figure 1B:
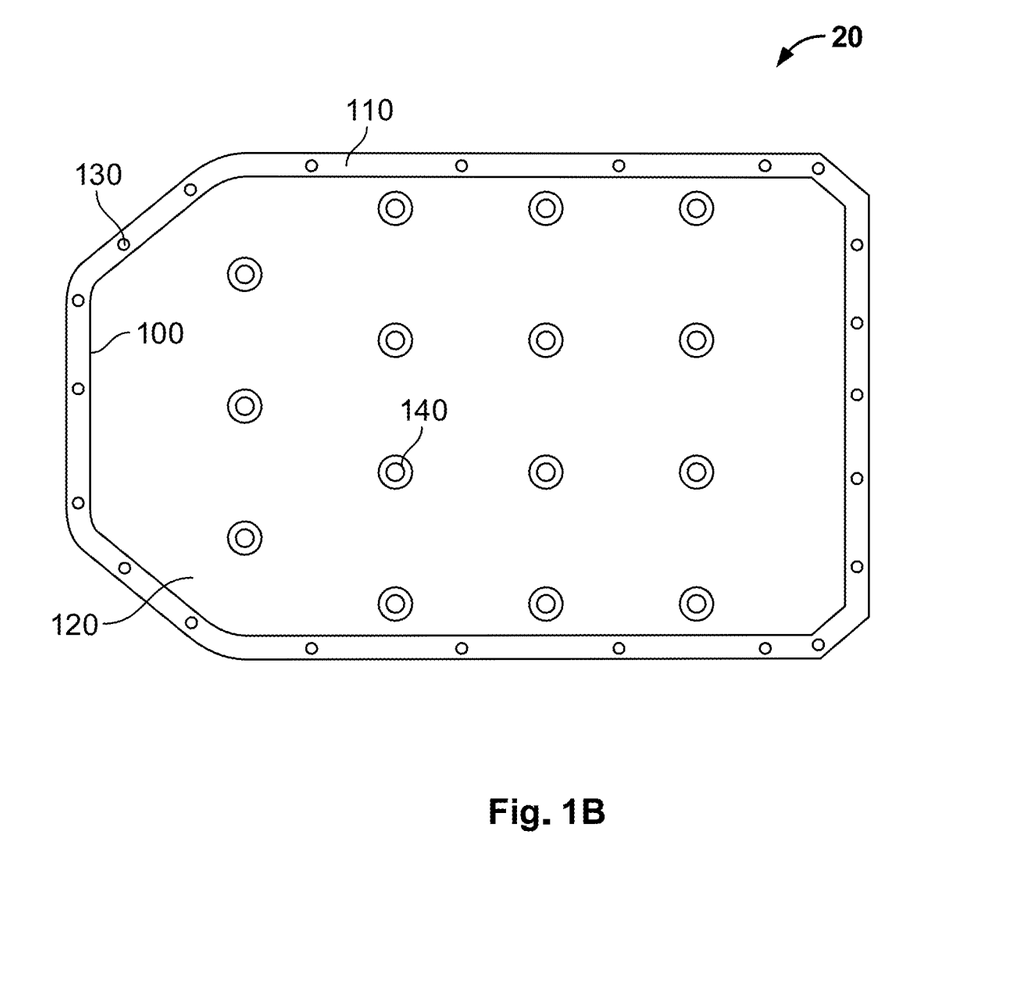
FIG. 1B is a plan view of a bottom surface of a battery pack cover constructed in accordance with some embodiments of the disclosure.

FIG. 1B is a plan view of a bottom surface of a battery pack cover constructed in accordance with some embodiments of the disclosure. In particular, FIG. 1B is a view of the surface of cover 20 that faces the frame 30 in FIG. 1A. The bottom surface of cover 20 has a sealing element 100 that extends along and proximate to the outer edge of the cover 20, so that an outer portion 110 of the bottom surface of cover 20 extends from the sealing element 100 to the outer edge of cover 20, and an inner portion 120 of the bottom surface of cover 20 extends inward from the sealing element 100. The inner portion 120 has a number of fastening elements 140 attached thereto. As described further below, the fastening elements 140 are attached to the inner portion 120 of the bottom surface of cover 20, without extending through or penetrating the inner portion 120 of the bottom surface of cover 20. The inner portion 120 of the bottom surface of cover 20 is thus a single continuous and unbroken surface with no holes or other openings, thus providing no pathway for infiltration of water into the battery pack.

The fastening elements 140 are each detachably or releasably coupled to corresponding fastening elements located on frame 30. When attached in this manner, sealing element 100 is pressed against the upper surface of frame 30 to create a waterproof seal between the cover 20 and frame 30. The cover 20 and frame 30 may be further secured to each other using bolts that extend through bolt holes 130. As shown, bolt holes 130 are located in outer portion 110 of cover 20 and thus are separated from the inner volume of the battery pack by sealing member 100. Accordingly, to the extent any water infiltrates through a bolt hole, sealing member 100 will prevent the water from reaching the interior of the battery pack.

Sealing element 100 may be any seal or other material suitable for generating a waterproof seal when the cover 20 and frame 30 are pressed together, e.g., a flexible rubber or plastic sealant layer or the like. Additionally, while sealing element 100 is shown in FIG. 1B as being affixed to cover 20, embodiments of the disclosure contemplate any sealing element 100 affixed to any part of battery pack 10. For example, sealing element 100 may instead be affixed to frame 30.

Figure 2:
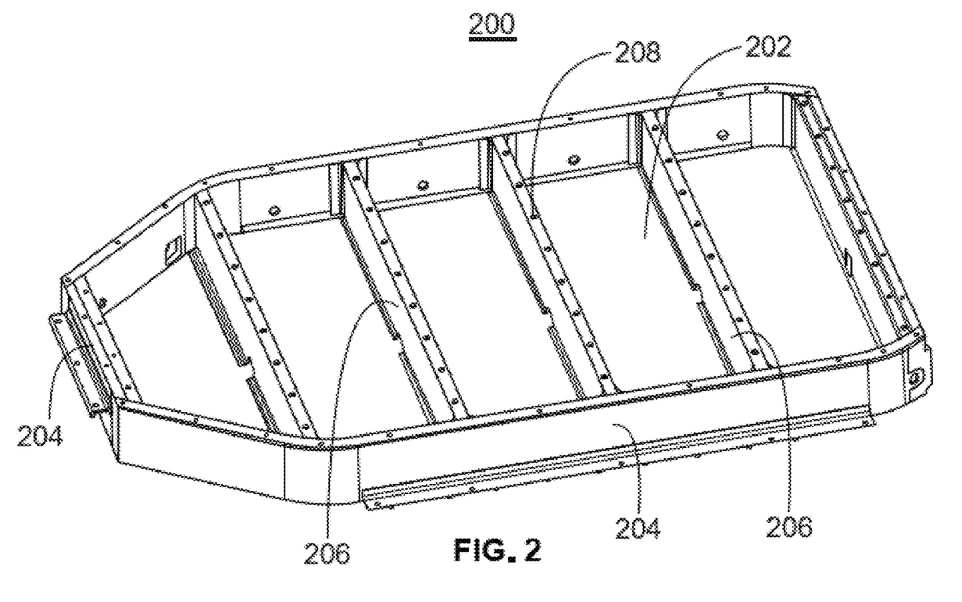
FIG. 2 depicts an exemplary battery pack frame in accordance with some embodiments of the disclosure.

FIG. 2 depicts an exemplary battery frame 200 in accordance with some embodiments of the present disclosure. The frame 200, which may be an example of frame 30 of FIG. 1A, includes a bottom surface having a horizontal bottom plate 202 such as a single metal sheet (or other suitable material) or a plurality of welded metal sheets (or other suitably bonded materials). In one embodiment, the bottom plate 202 of the frame 200 is permanently attached to the frame and provides for desirable structural rigidity for the vehicle but may limit access to the bottom portion of the frame 200 during installation of battery modules, as bottom-side access by technicians and robots is unavailable. A plurality of side members 204 extend vertically from the bottom plate 202 to complete the frame 200, which may include front, side, and rear portions of the frame as well as cross members 206 connected between the exterior parts of the frame 200. Accordingly, the cross members 206 extend between the side members 204 creating cavities in the frame 200. Although not depicted in FIG. 2, cross members may also extend between the front and rear of the vehicle and/or may form a grid, based on desired design and support considerations for the vehicle. Moreover, it will be understood that the battery frame depicted in FIG. 2 is exemplary and the battery frame may include a variety of suitable shapes and proportions based on desired end-use and structural characteristics.

In one embodiment, one or more upper surfaces of the side and the cross members 204 and 206 respectively include suitable attachment surfaces for interfacing with battery modules. In one example, the upper surfaces of the cross members 206 include threaded holes 208, which allow battery modules to be releasably bolted within the battery frame 200.

Figure 3:
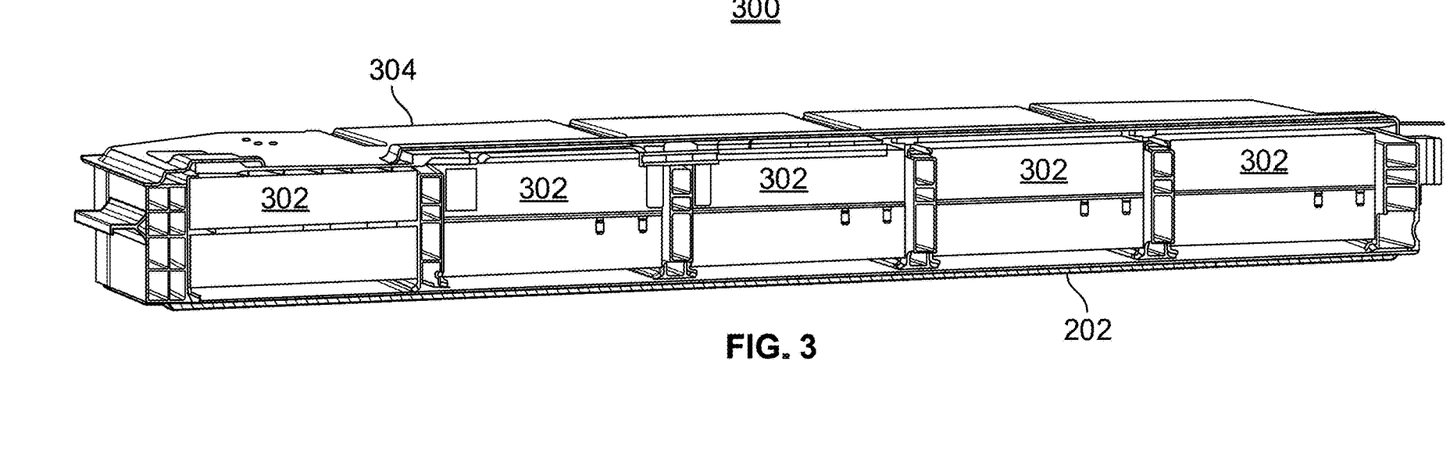
FIG. 3 depicts a battery system illustrating a longitudinal cross section of the battery frame with a number of battery modules installed therein in accordance with some embodiments of the present disclosure.
Figure 4:
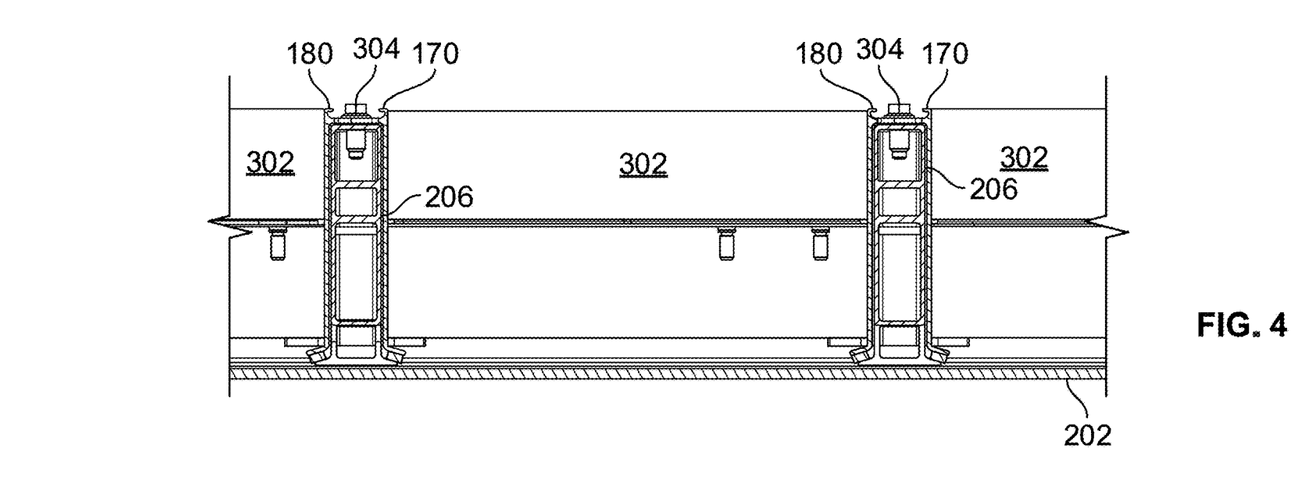
FIG. 4 depicts a close-up view of the cross-section of FIG. 3.

FIG. 3 depicts a battery system 300 illustrating a longitudinal cross-section of the battery frame with the battery modules 302 installed therein. Although five battery modules are shown, it will be understood that the number of battery modules are merely exemplary and any suitable number of the battery modules can be installed. Also shown is a removable cover such as a lid 304. FIG. 4 depicts a close-up view of the cross-section of FIG. 3. As illustrated in FIGS. 3 and 4, attachment surfaces 170 of the battery modules 302 rest upon upper surfaces of the cross members 206.

As illustrated in one embodiment, the battery modules 302 are securely attached to the cross members 206 of the frame 200 by, for example, top side fastening bolts 306. In some embodiments, the attachment surfaces of adjacent battery modules are offset such that each attachment surface is separately attached by a respective fastening bolt 306. In some embodiments, the attachment surfaces of adjacent battery modules overlap each other vertically or are adjacent to each other laterally such that a single bolt 306 can be used to secure two attachments surfaces from adjacent battery modules. In some embodiments, two or more attachment surfaces are provided on the ends of the battery modules. In some embodiments, the attachment surfaces form a nested pattern with the attachment surfaces of an adjacent battery module.

In some embodiments, the design of the battery pack frames and the battery modules described herein provides convenient access to the top of the battery modules, which can be easily removed using the exposed topside fastening bolts 306. It will be understood that the fastening bolts 306 shown are merely exemplary and may be of any suitable size and shape. In particular, fastening bolts 306 may also serve as fastening elements for connection with fastening elements 140 of cover 20.

Figure 5:
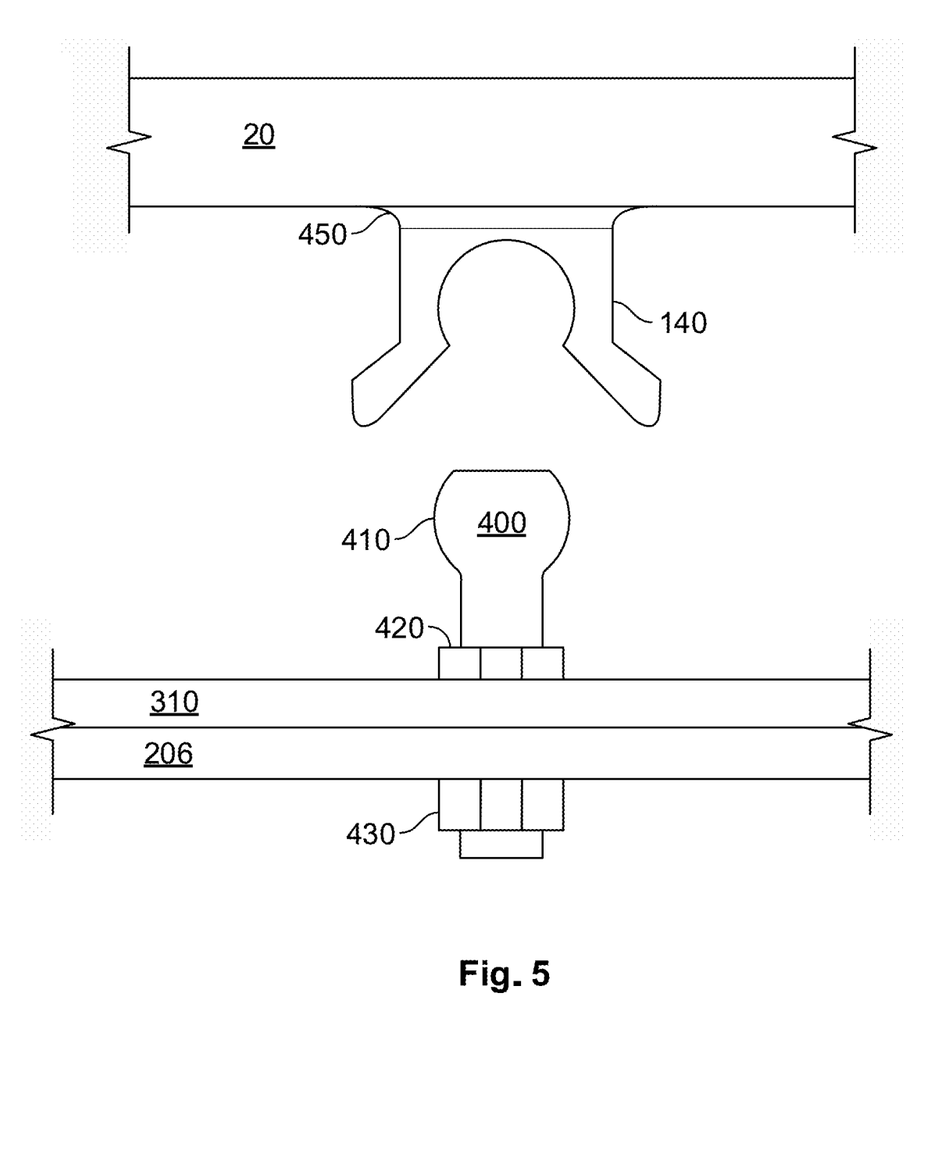
FIG. 5 is a cross-sectional view of fasteners for detachably coupling a battery pack cover and frame, in accordance with some embodiments of the disclosure.

FIG. 5 is a cross-sectional view of fasteners for detachably coupling a battery pack cover and frame, in accordance with some embodiments of the disclosure. As above, fastening element 140 may be affixed to inner portion 120 of cover 20, such as by an adhesive 450 (which may be any adhesive material, e.g., an epoxy resin, cyanoacrylate adhesive, silicone adhesive, polyurethane glue, or the like). Fastening bolts 306 were described above as coupling or securely attaching surfaces 310 and 312 of battery modules 302 to cross members 206 of frame 200. In some embodiments, fastening bolts 306 may further act as fasteners for connection to fastening elements 140 of cover 20. More specifically, fastening bolts 304 may each be configured as a ball fastener 400 with a ball 410 that extends upward from cross members 206 and a flange 420 which, along with a nut 430, secures the ball fastener 400 to attachment surface 310 and cross member 206. Fastening element 140 is thus shaped as a socket as shown in FIG. 5, accommodating a ball 410. In this manner, cover 20 may be positioned with each fastening element 140 over a corresponding ball 410, and pressed onto frame 30 so that each ball 410 is pressed into a corresponding socket of a fastener 140. The cover 20 may thus be detachably affixed to the frame 30, where detachment may be accomplished by pulling the cover 20 away from frame 30 with sufficient force to disengage each ball 410 from the socket of its corresponding fastening element 140.

Embodiments of the disclosure may employ any size and type of fastener suitable for releasable attachment of cover 20 to frame 30. For example, when ball and socket fasteners are employed, ball 410 may be any size ball, such as a 3-4 mm diameter ball, and sockets of fastening elements 140 may be sized accordingly. Similarly, fastening elements 140, 400 may be any other type of detachable or snap-fit fastener, such as magnetic fasteners, hook and eye fasteners, or the like.

Figure 6:
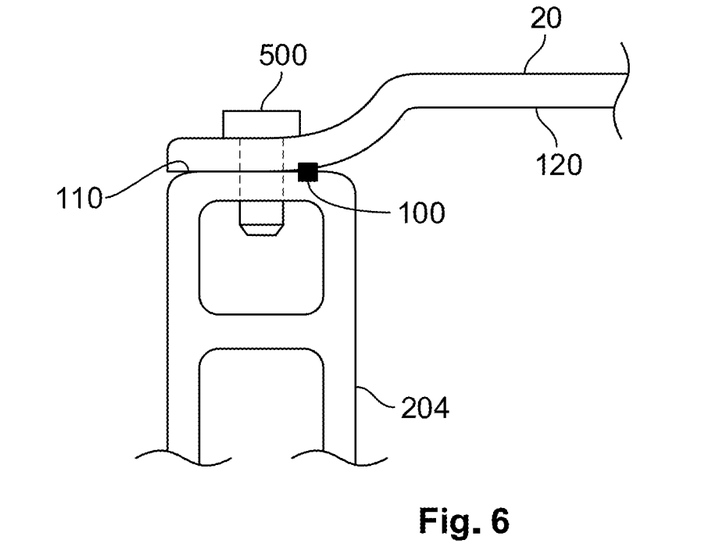
FIG. 6 is a cross-sectional view of a sealed connection between an outer edge of a battery pack cover and frame, in accordance with some embodiments of the disclosure.

In addition to the fastening elements 140 and 400, cover 20 may also be affixed on frame 30 using fasteners such as bolts. FIG. 6 is a cross-sectional view of a sealed connection between an outer edge of a battery pack cover and frame, in accordance with some embodiments of the disclosure. Here, fasteners such as bolts 500 may be added for a more secure connection between cover 20 and side members 204 of frame 30. When bolts 500 are used, holes 130 must be formed in the cover 20. As above, such holes 130 may provide pathways for infiltration of water or moisture. Accordingly, holes 130 are placed outside seal 100 within the outer portion 110 of cover 20, so that no additional leakage risk is presented. The use of bolts 500, and thus the presence of holes 130, is optional, and cover 20 may be releasably affixed to frame 30 with only fastening elements 140, 400 if desired. Accordingly, any number of bolts 500, including zero, may be employed. Additionally, embodiments of the disclosure are not limited to the use of bolts 500, and any other type of fastener may be employed to couple frame 20 to side members 204 of frame 30.

Bolts 500 may be spaced any distance apart from each other along side members 204. For example, adjacent bolts 500 may be spaced 200-400 mm apart from each other along the outer edge of frame 200.

Figure 7:
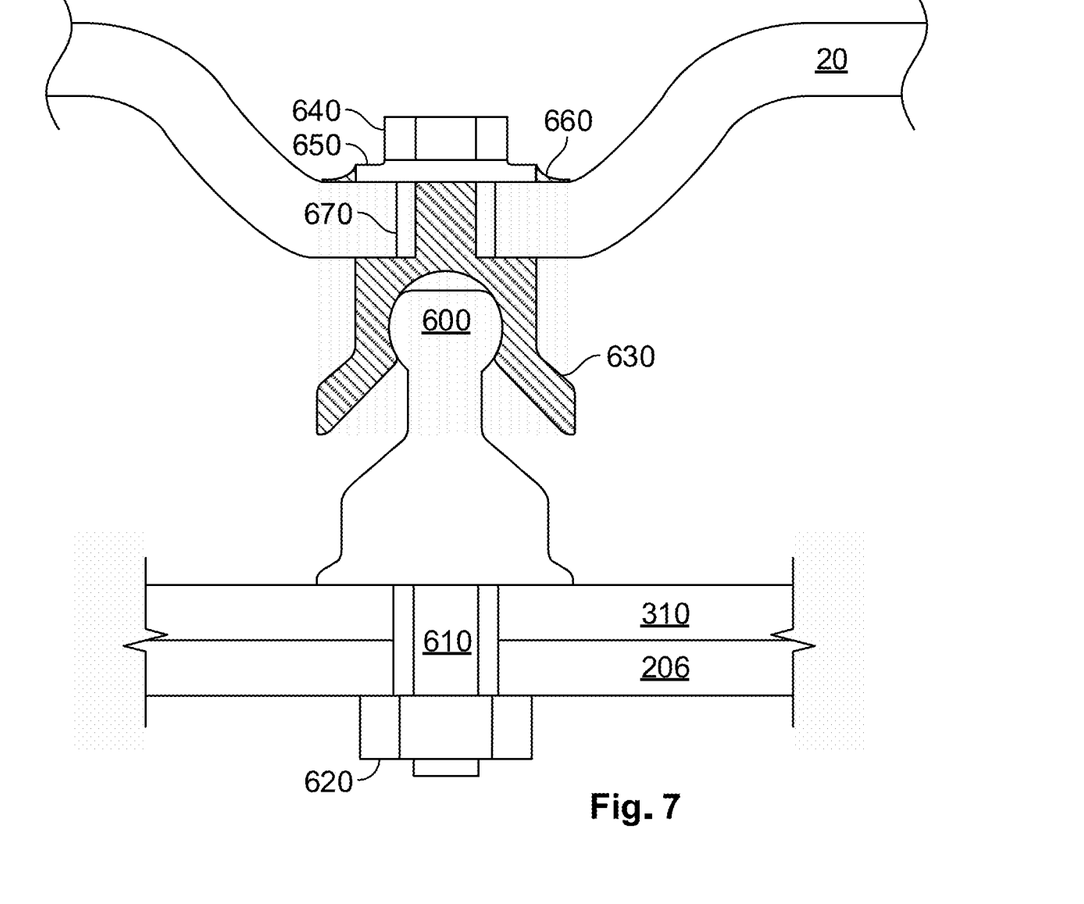
FIG. 7 is a cross-sectional view of fasteners for removably coupling a battery pack cover and frame, in accordance with further embodiments of the disclosure.

Embodiments of the disclosure are not limited to the ball and socket fastener configuration described above. Rather, any type of releasable or detachable fastening mechanism may be used, and in particular any type or configuration of ball and socket fastener may be employed. FIG. 7 is a cross-sectional view of fasteners for releasably coupling a battery pack cover and frame, in accordance with further embodiments of the disclosure. Here, cover 20 and cross members 206 of frame 30 are detachably coupled to each other via ball and socket fastening elements 600, 630. In particular, ball fastener 600 is affixed to a cross member 206 and overlying attachment surface 310 of a battery module 302 with a nut 620 that attaches to an extension member 610. That is, the ball fastener 600 may extend through holes in cross member 206 and attachment surface 310 to be affixed thereto by, e.g., nut 620. The ball fastener 600 may be a single integral structure, or may be an attachment friction fit over a bolt or screw. That is, in this latter configuration, extension member 610 may be, e.g., a bolt or screw, and the ball fastener 600 may be a protrusion friction fit or otherwise attached to the head of the bolt or screw.

Fastening element 630 may be affixed to a surface of cover 20 as above, or as shown in FIG. 7 may extend through a hole 670 in cover 20 for coupling thereto. In this latter case, fastening element 630 may extend through hole 670 to be bolted to cover 20 via a fastening mechanism such as a nut 640 and washer 650. An adhesive 660 may be applied to seal the hole 670 and prevent leakage. While fastening element 630 extends through hole 670, the connection is intended to be permanent so that the sealant is maintains its integrity. That is, fastening element 630 does not need to be removed from cover 20 in order for cover 20 to be removed from frame 30. In some embodiments, fastening element 630 may be secured to cover 20 using a rivet (e.g., a self-sealing rivet or a rivet coated with an adhesive or sealant). Fastening element 630 may be affixed within a depression or corrugation of cover 20 as shown in FIG. 7, although embodiments of the disclosure contemplate positioning of fastening element 630 at any portion of cover 20 regardless of its shape or elevation. The fastener 600, 630 may also be sized to provide any clearance between cover 20 and frame 30. For example, fastener 600, 630 may be sized to provide a 12 mm clearance between either attachment surface 310 or cross member 206, and the cover 20.

Figure 8:
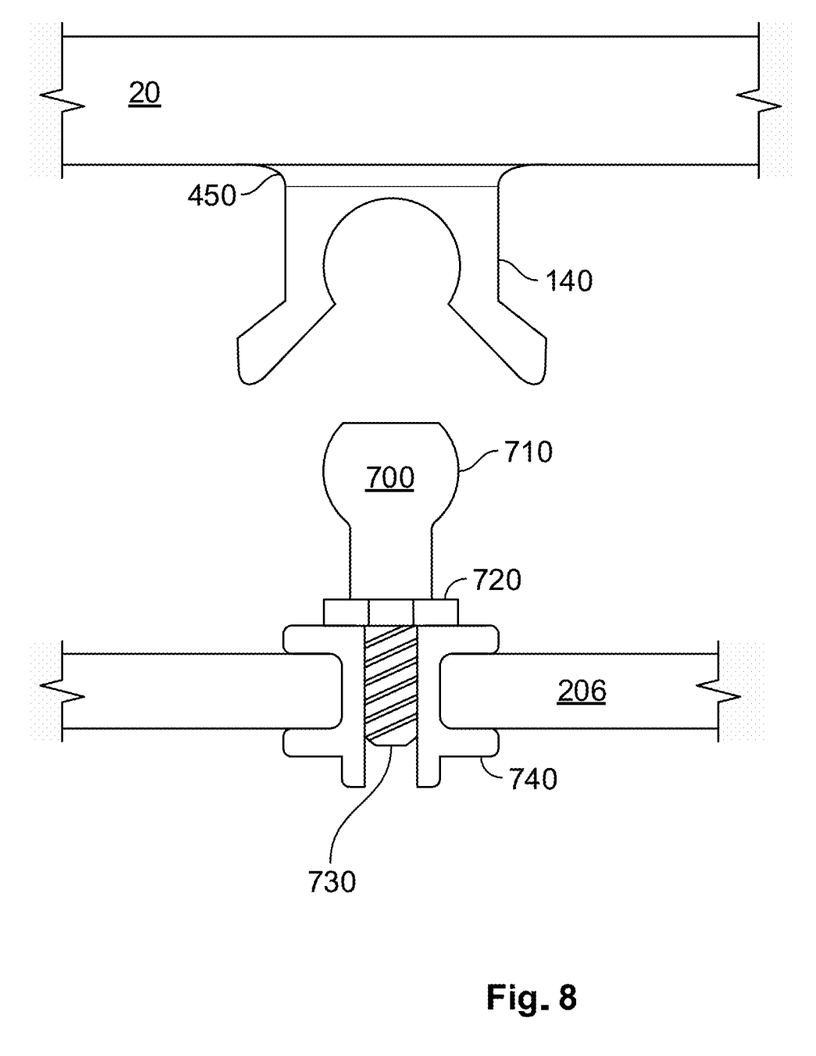
FIG. 8 is a cross-sectional view of fasteners for removably coupling a battery pack cover and frame, in accordance with still further embodiments of the disclosure.

FIG. 8 is a cross-sectional view of further fastener configurations in accordance with embodiments of the disclosure. Here, cover 20 and cross members 206 of frame 30 are detachably coupled to each other via ball and socket fastening elements 700, 140. In particular, anchor 740 is affixed to cross member 206 (without attachment surface 310 of battery module 302), and ball fastener 700 is affixed to anchor 740 in any manner, such as by a flange 720 and a threaded bolt end 730. That is, the ball fastener 700 may be coupled to cross member 206 via an anchor 740. Such configuration may be employed, for example, in areas of cross member 206 not having an overlying attachment surface 310, or in any other configuration in which use of an anchor 740 is desired. Additionally, while attachment surface 310 is not shown in FIG. 8, embodiments of the disclosure contemplate coupling of anchor 740 to any one or more structures, including cross member 206, attachment surface 310, or any other layer or structure.

Although embodiments of the disclosure have been described as having ball and socket fasteners in which the ball element is coupled to the frame and the socket element is coupled to the cover, other embodiments of the disclosure are not limited to this configuration. For example, ball elements may instead be coupled to the cover, and socket elements may be coupled to the frame.

Furthermore, embodiments of the disclosure contemplate any number and arrangement of fastening elements. For example, FIGS. 1B and 2 show a battery pack frame 200 with four cross members 206. These cross members 206 may each have any number of fastening elements affixed thereto, with a corresponding number of fastening elements affixed to cover 20. In the example of FIG. 1B, each cross member 206 has three or four fastening elements affixed thereto, with a corresponding number of fastening elements affixed to the cover 20. However, the number of fastening elements affixed to any cross member 206 may vary, e.g., from zero to six or more. As one example, cross members 206 that have a length of 4-6 feet and may have 3 to 4+ fasteners each.

It is also noted that the fastening elements may be placed at any location on cover 20 or frame 30. For instance, fastening elements are not limited to placement on cross members 206, and may be placed anywhere along any portion of frame 30. In addition, the fastening elements need not be integrated into the top of bolts 306 that secure battery modules 302 to cross members 206. For example, the fastening elements can be attached to cross members 206 where the attachment surfaces of the battery modules are not located. In some embodiments, other members may be constructed to extend from cross members 206, side members 204, or any other portion of frame 30, to support fastening elements anywhere within frame 30. In some embodiments, frame 30 includes any support structure attached to cross members 206 and side members 204, including, for example, structural elements of the battery modules. Accordingly, in some embodiments of the disclosure, fastening elements may be placed to dampen or otherwise reduce the amplitude of vibrations of cover 20. For example, fastening elements may be placed at or near antinodes of any cover vibration modes, to constrain those modes from generating unwanted vibration during vehicle operation.

The foregoing description, for purposes of explanation, used specific nomenclature to provide a thorough understanding of the disclosure. However, it will be apparent to one skilled in the art that the specific details are not required to practice the methods and systems of the disclosure. Thus, the foregoing descriptions of specific embodiments of the present disclosure are presented for purposes of illustration and description. They are not intended to be exhaustive or to limit the invention to the precise forms disclosed. Many modifications and variations are possible in view of the above teachings. For example, any type, number, and arrangement of fastening elements may be used to detachably affix battery pack covers and frames. Fastening elements may not penetrate or extend through the cover, or optionally may extend through holes formed in the cover. The embodiments were chosen and described in order to best explain the principles of the disclosure and its practical applications, to thereby enable others skilled in the art to best utilize the methods and systems of the disclosure and various embodiments with various modifications as are suited to the particular use contemplated. Additionally, different features of the various embodiments, disclosed or otherwise, can be mixed and matched or otherwise combined so as to create further embodiments contemplated by the disclosure. All dimensional values are approximate, and may vary.

What is claimed is:

1. An electric vehicle battery pack, the battery pack comprising:
a frame for batteries positioned in an interior space therein, the frame having cross members and first fastening elements affixed to the cross members; and
a cover having a continuous inner surface having no openings therein, and second fastening elements affixed to the surface;
wherein the second fastening elements are configured to couple to respective first fastening elements when the cover is pressed downward onto the frame to releasably couple the cover to the frame.

2. The electric vehicle battery pack of claim 1, wherein the first and second fastening elements collectively comprise snap-fit fasteners.

3. The electric vehicle battery pack of claim 2, wherein the first and second fastening elements collectively comprise ball and socket fasteners.

4. The electric vehicle battery pack of claim 2, wherein the frame comprises first and second side members and the cross members extending from the first side member to the second side member.

5. The electric vehicle battery pack of claim 4, wherein at least two of the second fastening elements are affixed to each of the cross members.

6. The electric vehicle battery pack of claim 1, further comprising a seal contacting the frame and the cover, the seal extending along an outer edge of the surface of the cover to surround the second fastening elements.

7. The electric vehicle battery pack of claim 6, further comprising third fastening elements positioned between the seal and an outer edge of the frame, the third fastening elements extending through the cover to couple the cover to the frame.

8. The electric vehicle battery pack of claim 1, wherein the second fastening elements do not extend through the surface of the cover.

9. The electric vehicle battery pack of claim 8, wherein the second fastening elements are adhesively affixed to the surface of the cover.

10. The electric vehicle battery pack of claim 1, wherein the first and second fastening elements constrain vibration of the cover during operation of an electric vehicle.

11. A cover for an electric vehicle battery pack, the cover comprising:
a surface for coupling to a frame of the battery pack, the surface having an outer portion and at least one inner portion within the outer portion, wherein the at least one inner portion is a continuous surface having no openings therein; and
a plurality of fasteners affixed to the at least one inner portion of the surface, wherein the fasteners are positioned for releasably coupling to cross members of the frame when the cover is pressed downward onto the frame.

12. The cover of claim 11, wherein the fasteners are first fastening elements, wherein second fastening elements are affixed to the frame, and wherein each of the first fastening elements is configured to releasably couple to a respective one of the second fastening elements.

13. The cover of claim 12, wherein the first fastening elements and the second fastening elements collectively comprise ball and socket fasteners.

14. The cover of claim 12, wherein the first fastening elements and the second fastening elements collectively comprise snap-fit fasteners.

15. The cover of claim 11, further comprising a seal extending along the outer portion to surround the fasteners.

16. The cover of claim 11, wherein the fasteners do not extend through the surface.

17. The cover of claim 11, wherein the fasteners are adhesively affixed to the at least one inner portion of the surface.

18. The cover of claim 11, wherein the fasteners, when attached to corresponding fasteners of the frame, constrain vibration of the cover during operation of an electric vehicle.

19. A cover, comprising:
- a surface for coupling to a frame of a battery pack, the surface having an outer portion and at least one inner portion within the outer portion; and
- a plurality of fasteners affixed to the at least one inner portion of the surface and configured to releasably couple the cover to the frame when the cover is pressed downward onto the frame; and
- a seal extending along the outer portion to surround the fasteners, wherein the outer portion of the surface has a plurality of holes extending therethrough.

\* \* \* \* \*